(12) United States Patent
Umemoto et al.

(10) Patent No.: US 6,590,625 B1
(45) Date of Patent: Jul. 8, 2003

(54) LIQUID-CRYSTAL DISPLAY DEVICE

(75) Inventors: Seiji Umemoto, Osaka (JP); Shuuji Yano, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/576,195

(22) Filed: May 23, 2000

(30) Foreign Application Priority Data

May 24, 1999 (JP) .......................................... 11-143495

(51) Int. Cl.⁷ ............................................ G02F 1/1335
(52) U.S. Cl. ............................................. 349/65; 349/114
(58) Field of Search .................... 349/65, 114; 385/146; 362/556, 561, 554, 26, 31

(56) References Cited

U.S. PATENT DOCUMENTS

| | | | |
|---|---|---|---|
| 5,408,388 A | | 4/1995 | Kobayashi et al. |
| 5,418,631 A | * | 5/1995 | Tedesco ............... 349/176 |
| 5,485,354 A | | 1/1996 | Ciupke et al. |
| 5,587,816 A | * | 12/1996 | Gunjima et al. ........... 349/113 |
| 5,664,862 A | | 9/1997 | Redmond et al. |
| 5,727,107 A | * | 3/1998 | Umemoto et al. ........... 385/116 |
| 5,808,709 A | * | 9/1998 | Davis et al. ............... 349/65 |
| 5,828,471 A | * | 10/1998 | Davis et al. ............... 349/61 |
| 5,914,760 A | * | 6/1999 | Daiku ...................... 349/62 |
| 5,999,239 A | * | 12/1999 | Larson ..................... 349/96 |
| 6,111,696 A | * | 8/2000 | Allen et al. ............... 349/96 |
| 6,151,089 A | * | 11/2000 | Yang et al. ................ 349/113 |
| 6,196,692 B1 | * | 3/2001 | Umemoto et al. ............ 362/31 |
| 6,199,995 B1 | * | 3/2001 | Umemoto et al. ............ 362/31 |

FOREIGN PATENT DOCUMENTS

| | | | |
|---|---|---|---|
| EP | 0867747 A2 | * | 9/1998 |
| EP | 0879991 A2 | * | 11/1998 |
| EP | 884620 | | 12/1998 |
| JP | 07005462 | | 1/1995 |
| JP | 08094844 | | 4/1996 |
| JP | 10-106328 | | 4/1998 ............ F21V/8/00 |
| WO | WO-93/16410 | * | 8/1993 |
| WO | WO 9839755 | | 9/1998 |

OTHER PUBLICATIONS

Patent Abstracts of Japan, vol. 1999, No. 2, Feb. 26, 1999 & JP 10 311915 (Matsushita Electric Ind. Co. Ltd.), Nov. 24, 1998.
Patent Abstract of Japan, 10106328, Apr. 24, 1998.

* cited by examiner

*Primary Examiner*—Kenneth Parker
(74) *Attorney, Agent, or Firm*—Sughrue Mion, PLLC

(57) ABSTRACT

A liquid-crystal display device has a light pipe, a light source, a reflection layer, a light diffusion layer, and a liquid-crystal shutter. The light pipe is provided with light output means formed on an upper surface thereof. The light source is disposed near to an incident side surface of the light pipe so that light incident on the light pipe from the light source is delivered from a lower surface of the light pipe through the light output means. The reflection layer is disposed on the lower surface of the light pipe so that reflected light of the output light is transmitted through the upper surface. The light diffusion layer has polarization-keeping characteristic. The liquid-crystal shutter is disposed on the upper surface of the light pipe through the light diffusion layer, the liquid-crystal shutter including liquid-crystal cells and at least one polarizing plate.

18 Claims, 3 Drawing Sheets

LIQUID-CRYSTAL DISPLAY DEVICE

BACKGROUND OF THE INVENTION

1. Field of the Invention

The present invention relates to a liquid-crystal display device which is excellent in light utilizing efficiency and which provides a brilliant display easy to see.

The present application is based on Japanese Patent Application No. Hei. 11-143495, which is incorporated herein by reference.

2. Description of the Related Art

There is investigation of a liquid-crystal display device which is used both in a reflection and a transmission mode so that the device can be visually recognized in use of the transmission type liquid-crystal display device in a dark place, or the like, by addition of an illuminator while the merit of a reflection type liquid-crystal display device of small power consumption is used widely. For example, a liquid-crystal display device using a semi-transmission type reflection plate, a liquid-crystal display device in which a back light used in a transmission type liquid-crystal display device is arranged as a front light on the visual recognition side of liquid-crystal cells, and so on, have been proposed.

The system utilizing such a semi-transmission type reflection plate, however, had a disadvantage that the system in either mode was inferior in brightness to the reflection or transmission type device for exclusive use because light was separated into reflected and transmitted light by a half-mirror effect. In consideration of the disadvantage, there was a proposal to make an improvement by use of a reflection polarizer for reflecting polarized light selectively so that the sum of reflectivity and transmissivity was able to exceed 100%. However, there were problems in that the efficiency of light utilizing efficiency in a transmission mode was reduced to be not higher than 50% because of absorption by a light absorber disposed for preventing both display inversion between reflection and transmission and emphasis of a black display, and display was hard to see in the evening twilight in either mode.

On the other hand, there was a problem in that the front light system was apt to make a display darker in a transmission mode than the general transmission type liquid-crystal display device because light went to light-crystal cells, or the like, and came back. Accordingly, an injury of a light pipe or a contaminant thereon became conspicuous as a bright spot, and display contrast was lowered by leakage of light from an upper surface of the light pipe.

SUMMARY OF THE INVENTION

An object of the present invention is to develop a liquid-crystal display device of good visual recognition which is excellent in brightness and uniformity of brightness both in reflection and transmission modes, and in which display inversion, lowering of contrast due to leakage of light, and the visual sense of dazzling light do not occur.

According to the present invention, there is provided a liquid-crystal display device comprising: a light pipe provided with light output means formed on an upper surface of the light pipe; a light source disposed near to an incident side surface of the light pipe so that light incident on the light pipe from the light source is delivered from a lower surface of the light pipe through the light output means; a reflection layer disposed on the lower surface of the light pipe so that reflected light of the output light is transmitted through the upper surface; a light diffusion layer having polarization-keeping characteristic; and a liquid-crystal shutter disposed on the upper surface of the light pipe through the light diffusion layer, the liquid-crystal shutter including liquid-crystal cells, and at least one polarizing plate.

According to the present invention, there is provided a structure in which the light pipe and the polarization-keeping light diffusion layer are disposed between the reflection layer and the liquid-crystal cells. Lowering of light utilizing efficiency in a reflection mode is no more than absorption loss, reflection loss, etc. due to the light pipe and the light diffusion layer. Lowering of the degree of polarization due to the light diffusion layer is also slight. As a result, brilliance approximately equivalent to that of a background-art reflection type liquid-crystal display device can be achieved in a reflection mode. Moreover, brilliance not at all inferior to that of a background-art transmission type liquid-crystal display device can be achieved in a transmission mode. In addition, inversion of display does not occur between reflection and transmission.

Moreover, lowering of contrast caused by leakage light from the light pipe does not occur. By the effect of diffusion through the light diffusion layer, the display is made excellent in uniformity of brightness. At the same time, the visual sense of dazzling light caused by both bright-line-shaped light emission and metallic reflection is suppressed. Moreover, an in-display image of the light output means formed on the light pipe is weakened, so that the pattern of the light output means is prevented from becoming visible. As a result, a liquid-crystal display device of a good visual recognition property can be obtained.

Moreover, a light path in the light pipe in the transmission mode can be elongated by provision of the light output means on the upper surface of the light pipe. Hence, the spread of light is widened, so that the intensity of a bright line can be relaxed. This effectively acts on both prevention of occurrence of moire and enhancement of uniformity of brilliance advantageously, so that the reflection layer can be disposed on the lower surface of the light pipe so as to be brought into contact with and integrated with the light pipe through a tacky layer, or the like, easily. If such light output means is provided on the lower surface of the light pipe, it is necessary to provide an independent reflection plate separately in terms of the maintenance of the function of the light output means. As a result, the structure of the device is complicated because of increase in the number of parts and arrangement and fixation of the reflection plate. As a result, there is a disadvantage that the weight of the device becomes heavy because a thick support is required for preventing disorder of display from being caused by generation of wrinkles.

Further, in the case of a light pipe having light output means constituted by slopes such as prism-like irregularities, the light pipe is excellent in directivity of reflected light through the slopes. Accordingly, light advantageous to visual recognition in a transmission mode can be formed efficiently, so that more brilliant display can be obtained. The light pipe is further excellent both in incident efficiency of external light and in transmission efficiency after reflection thereof. Accordingly, more brilliant display can be obtained also in a reflection mode by light emission excellent both in light utilizing efficiency and in uniformity. Further, generation of moire due to the foregoing directivity can be suppressed by oblique arrangement of the light output means, so that inhibition of visual recognition due to dazzling light can be prevented from being generated.

As described above, in the case of a light pipe provided with scatter type light output means such as dots, embossed irregularities, or the like, output light is emitted at a large angle of about 60 degrees, so that display in a transmission mode is dark and hard to see in a frontal (vertical) direction. If a prism sheet is disposed for the purpose of controlling the light path, light is scattered in a reflection mode, so that a display is made very dark because a large part of light does not contribute to visual recognition. If a diffusion layer of a strong diffusing property is disposed in order to prevent dots, or the like, from being visible too clearly, a dark display is obtained in a reflection mode because both incident and reflected light thereof from the reflection layer are also scattered in the reflection mode.

Features and advantages of the invention will be evident from the following detailed description of the preferred embodiments described in conjunction with the attached drawings.

DETAILED DESCRIPTION OF THE PREFERRED EMBODIMENTS

The liquid-crystal display device according to the present invention comprises: a light pipe provided with light output means formed on an upper surface of the light pipe; a light source disposed near to an incident side surface of the light pipe so that light incident on the light pipe from the light source is delivered from a lower surface of the light pipe through the light output means; a reflection layer disposed on the lower surface of the light pipe so that reflected light of the output light is transmitted through the upper surface; a light diffusion layer having polarization-keeping characteristic; and a liquid-crystal shutter disposed on the upper surface of the light pipe through the light diffusion layer, the liquid-crystal shutter including liquid-crystal cells, and at least one polarizing plate. The liquid-crystal display device according to the present invention can be preferably used both in a reflection and a transmission mode.

Figure 1:
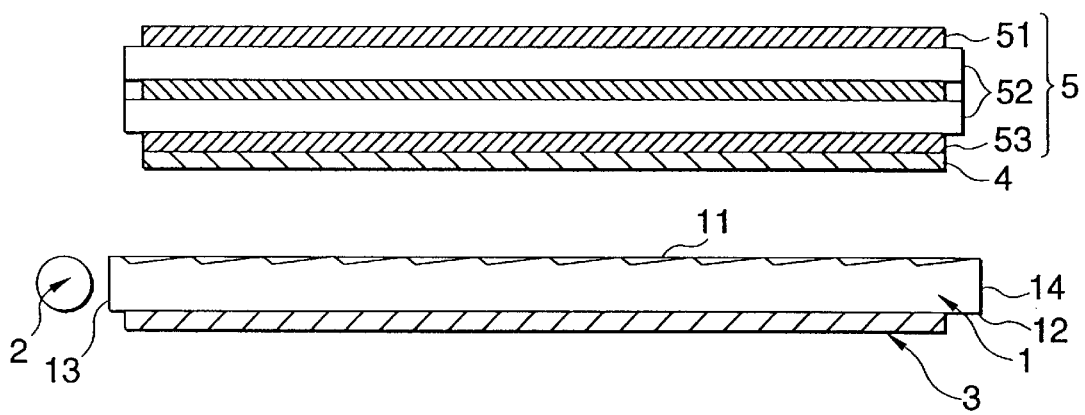
FIG. 1 shows an explanatory sectional view of an example of a liquid-crystal display device.

FIG. 1 shows an example of the aforementioned liquid-crystal display device. The reference numeral 1 designates a light pipe; 11, an upper surface of the light pipe on which light output means is formed; 2, a light source; 3, a reflection layer; 4, a light diffusion layer having polarization-keeping characteristic; 5, a liquid-crystal shutter; 51 and 53, polarizing plates (polarizing films); and 52, liquid-crystal cells.

As illustrated in FIG. 1, used as the light pipe is a plate-like material which has an upper surface 11, a lower surface 12 opposite to the upper surface, and an incident side surface 13 constituted by a side surface between the upper and lower surfaces and which is configured so that light incident on the incident side surface is delivered from the lower surface through the light output means formed on the upper surface 11.

The light pipe may be of a uniform thickness type as illustrated in FIG. 1 or may be of a type in which the thickness of an opposite end 14 opposite to an incident side surface 13 is set to be smaller than that of the incident side surface. Reduction of the thickness of the opposite end is advantageous in terms of reduction of weight, improvement of efficiency of light incident on the incident side surface toward the light output means of the upper surface, and so on.

The light output means provided on the upper surface of the light pipe can be constituted by an appropriate member exhibiting the aforementioned output property. From the point of view of obtaining illumination light excellent in frontal directivity through the reflection layer, the preferred is light output means having slopes facing the incident side surface, particularly light output means constituted by prism-like irregularities.

Figure 2:
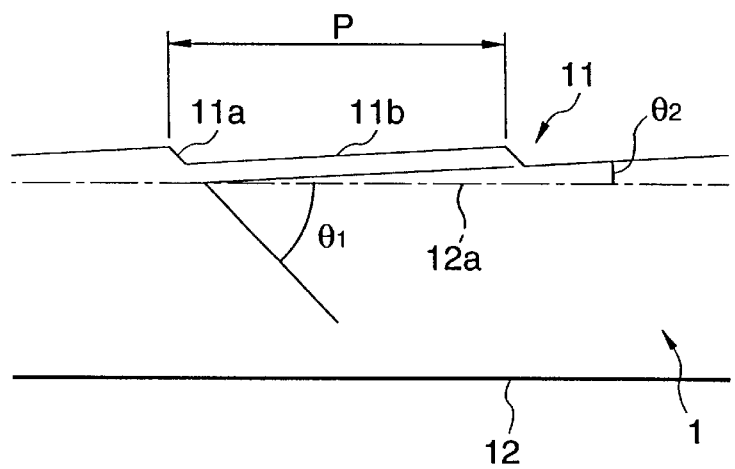
FIG. 2 is an explanatory side view of light output means in a light pipe.

Although the aforementioned prism-like irregularities may be constituted by projections or recesses having equilateral surfaces, it is preferable from the point of view of light utilizing efficiency, or the like, that the prism-like irregularities are constituted by projections or recesses each having a short side and a long side surface. FIG. 2 shows an example of the prism-like irregularities. The reference numeral 11a designates a short side surface; and 11b, a long side surface.

The light output means preferred from the point of view of achieving the aforementioned property such as frontal directivity, or the like, is constituted by a repetitive structure of irregularities each of which has a slope inclined at an inclination angle of from 35 to 45 degrees with respect to a reference plane of the lower surface, and a flat surface inclined at an angle of not larger than 10 degrees. Especially, as shown in FIG. 2, the light output means is constituted by a repetitive structure of prism-like irregularities each of which has a short side surface 11a ($\theta_1$) inclined downward from the incident side surface 13 toward the opposite end 14 at an inclination angle of from 35 to 45 degrees with respect to the reference plane 12a of the lower surface 12, and a long side surface 11b ($\theta_2$) inclined at an inclination angle of from 0 to 10 degrees, exclusive of 0 degree, with respect to the same reference plane 12a.

In the above description, the short side surface 11a formed as a slope inclined downward from the incident side surface toward the opposite end plays a role of reflecting light incident on the short side surface among incident light given from the incident side surface to thereby supply the reflected light to the lower surface (reflection layer). In this case, setting the inclination angle $\theta_1$ of the short side surface to be in a range of from 35 to 45 degrees permits transmitted light to be reflected well perpendicularly to the lower surface as shown by the polygonal line arrow in FIG. 3. As a result, output light (illumination light) excellent in frontal directivity can be obtained through the reflection layer 3 efficiently.

The preferred inclination angle $\theta_1$ of the short side surface from the point of view of the aforementioned frontal directivity, or the like, is in a range of from 38 to 44 degrees, especially in a range of from 40 to 43 degrees, in consideration of the fact that the condition for total internal reflection of light transmitted in the inside of the light pipe on the basis of Snell laws of refraction is generally ±41.8 degrees with the refractive index of, for example, 1.5.

Figure 3:
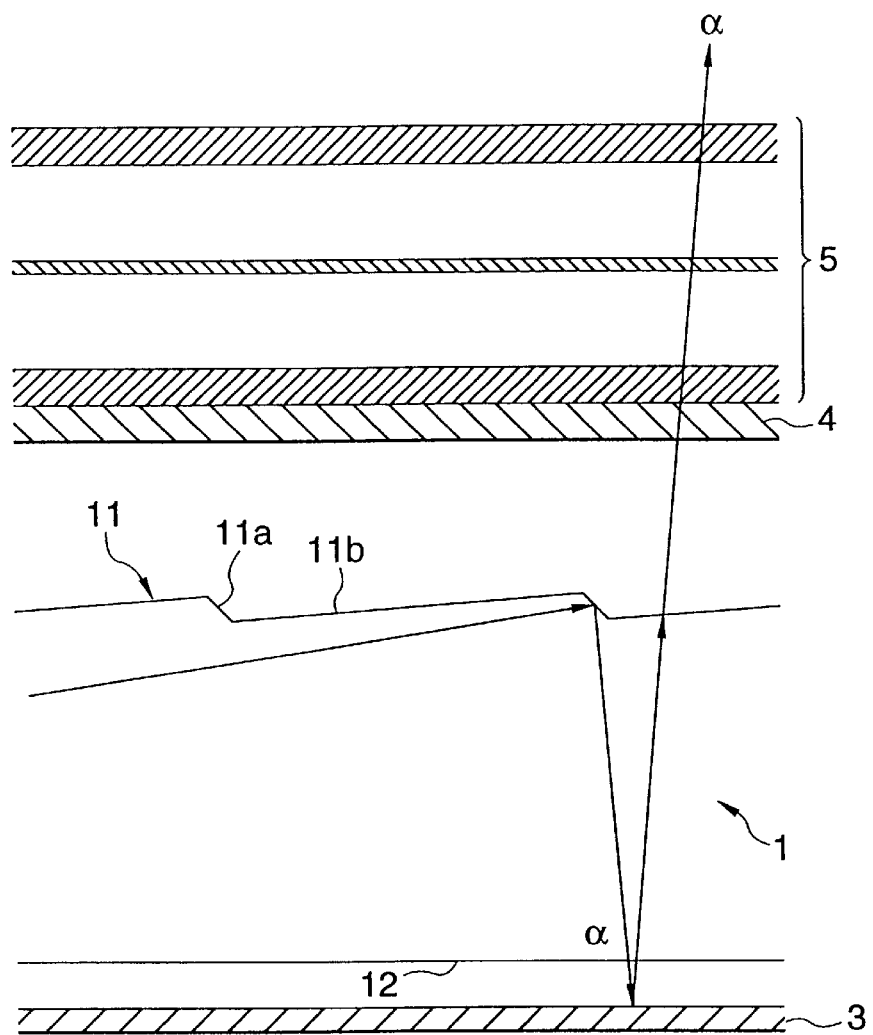
FIG. 3 shows an explanatory view of a visual recognition state in a transmission mode.
Figure 4:
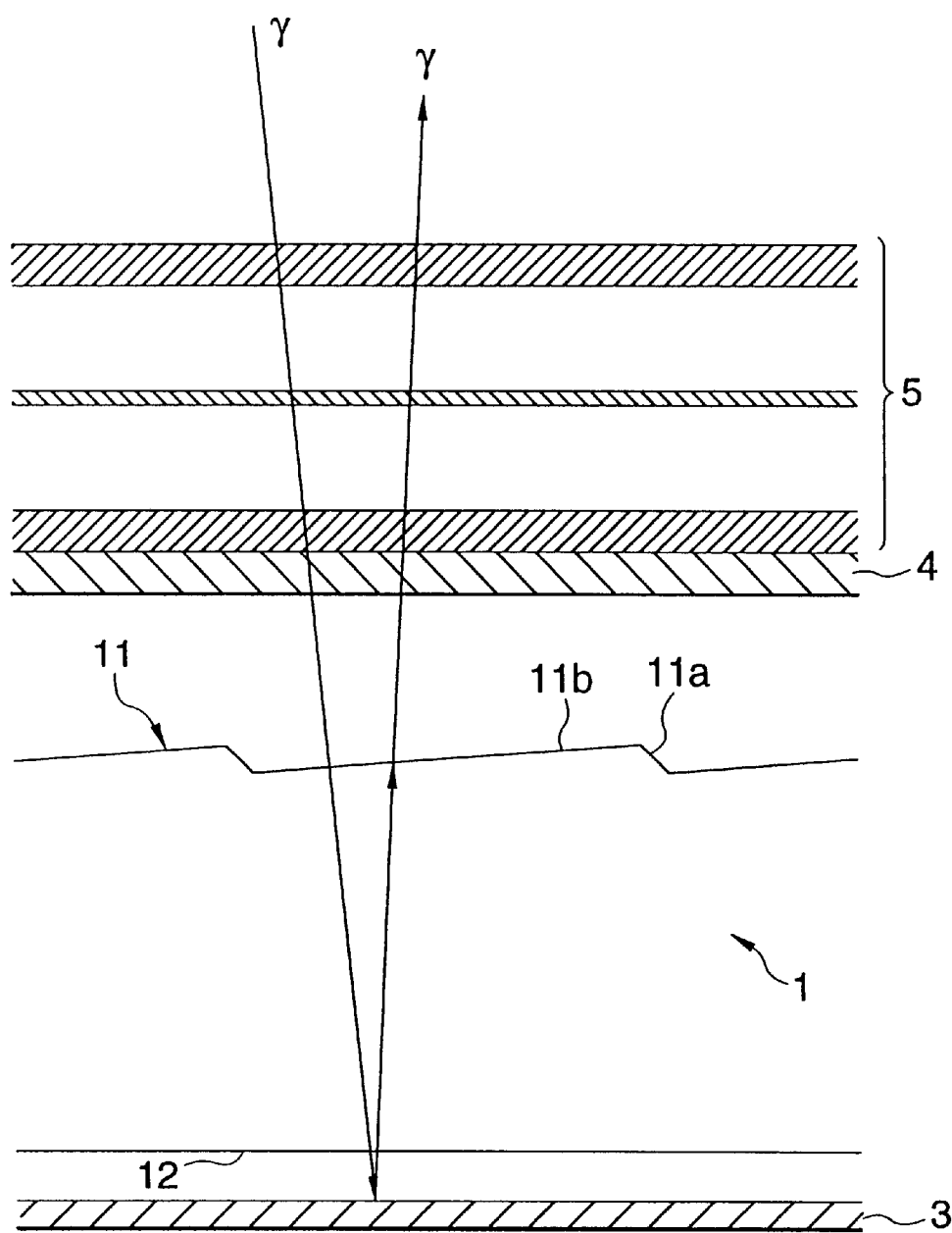
FIG. 4 shows an explanatory view of a visual recognition state in a reflection mode.

On the other hand, the long side surface aims at transmitting the light reflected by the short side surface and inverted through the reflection layer 3 as shown by the polygonal line arrow in FIG. 3, and aims at receiving external light in a reflection mode and transmitting the light reflected through the reflection layer 3 as shown by the polygonal line arrow in FIG. 4. From this point of view, the inclination angle $\theta_2$ of the long side surface with respect to the reference plane 12a of the lower surface is preferably set to be not larger than 10 degrees. If the inclination angle $\theta_2$ is larger than 10 degrees, the change of the light path due to refraction becomes large, resulting in reduction of light intensity in the frontal direction disadvantageously to display.

Incidentally, the inclination angle $\theta_2$ of the long side surface may be set to be 0 degree (horizontal plane). However, if it is set to be larger than 0 degree, transmitted light is allowed to be collimated when the transmitted light incident on the long side surface is reflected so as to be supplied to the short side surface. Hence, the directivity of the reflected light through the short side surface can be improved advantageously to display. From the point of view of increase of light intensity in the frontal direction, collimation of transmitted light, or the like, the preferred inclination angle $\theta_2$ of the long side surface is not larger than 8. degrees, especially not larger than 5 degrees.

The preferred long side surfaces from the point of view of the function, or the like, of the long side surfaces of the light pipe are provided so that the difference between the inclination angles $\theta_2$ of the long side surfaces is set to be within 5 degrees, especially within 4 degrees, particularly within 3 degrees all over the light pipe and that the difference between inclination angles $\theta_2$ of adjacent long side surfaces is set to be within 1 degrees, especially within 0.3 degrees, particularly within 0.1 degrees.

The aforementioned difference between the inclination angles $\theta_2$ is set on the premise that the inclination angle of each long side surface is not larger than 10 degrees as described above. That is, the premise is that such a small inclination angle $\theta_2$ is set to be in the allowed range to suppress deflection of a display image caused by refraction at the time of transmission of light through the long side surface. This aims at setting of an observation point in a direction near the vertical direction so that the direction of optimum visual recognition of the liquid-crystal display device thus optimized is not changed.

A device excellent in efficiency in incidence of external light and excellent in efficiency in light transmitting or delivering of a display image through liquid-crystal cells is preferred to a device which can obtain a brilliant display image. In this respect, prism-like irregularities are preferably provided so that the projected area of each long side surface onto a reference plane of the lower surface is not smaller than 8 times, especially 10 times, particularly 15 times as large as the projected area of each short side surface on the reference plane. By this measure, a large part of the display image through the liquid-crystal cells can be transmitted through the long side surfaces.

Incidentally, when the display image through the liquid-crystal cells is transmitted, the display image incident on the short side surfaces is reflected to the incident side surface so as not to be delivered from the upper surface or is deflected in a largely different direction, for example, in the direction opposite to the display image transmitted through the long side surfaces with reference to a normal line with respect to the lower surface so as to be delivered. Hence, the display image incident on the short side surfaces has little influence on the display image transmitted through the long side surfaces.

Accordingly, it is preferable in this respect that the short side surfaces are not localized relative to pixels of the liquid-crystal cells carrying logic to extremes, the display image through the long side surfaces in a direction near the vertical direction is hardly visible when the short side surfaces overlap with the pixels as a whole. Hence, from the point of view of preventing such an unnatural display from being caused by shortage of transmission of display light, or the like, it is preferable that the area of overlap of the short side surfaces with the pixels is reduced to secure sufficient transmissivity of light transmitted through the long side surfaces.

The pixel pitch for the liquid-crystal cells is generally in a range of from 100 to 300 $\mu$m. In consideration of the aforementioned point, the formability of the prism-like irregularities, and so on, the short side surfaces are preferably formed so that the projected width of each short side surface on the reference plane of the lower surface is not larger than 40 $\mu$m, especially in a range of from 1 to 20 $\mu$m, particularly in a range of from 3 to 15 $\mu$m.

Incidentally, a higher-grade technique is required for forming the short side surfaces as the projected width of each short side surface decreases. As a result, a scattering effect may appear as a cause of disorder of the display image, or the like, when the vertex of each of the prism-like irregularities is rounded with a curvature radius of not smaller than a predetermined value. Further, also from the point of view of the coherence length of a fluorescent tube generally set to be about 20 $\mu$m, or the like, there is a tendency that diffraction, or the like, is apt to occur so as to be a cause of lowering of the display quality when the projected width of each short side surface decreases.

Although it is preferable from the aforementioned point that the interval between the short side surfaces is relatively large, illumination at the time of lighting up may become more sparse to bring still an unnatural display when the interval is too large because the short side surfaces substantially serve as a portion having a function for delivering light incident on the side surface. In consideration of these points, the repetition pitch P of the prism-like irregularities as shown, by way of example, in FIG. 2 is preferably set to be in a range of from 50 $\mu$m to 1.5 mm.

Incidentally, the repetition pitch of the prism-like irregularities may be so irregular as to be provided as a random pitch, a random or regular combination of a predetermined number of pitch units, or the like. Generally, the pitch is preferably constant from the point of view of countermeasure to prevent occurrence of moire, improvement of external appearance against the visual sense of the pattern of the prism-like irregularities, etc.

In the case of the light output means constituted by prism-like irregularities, moire may occur because of interference with pixels of the liquid-crystal cells. Although prevention of moire can be performed by controlling the pitch of the prism-like irregularities, the pitch of the prism-like irregularities needs to be in a preferred range as described above. Hence, a countermeasure to occurrence of moire in spite of the pitch range becomes a subject of discussion.

According to the present invention, there may be preferably used a method in which the prism-like irregularities are formed to be inclined with respect to the reference plane of the incident side surface so that the prism-like irregularities can be arranged to cross pixels to thereby prevent occurrence of moire. In this case, if the inclination angle is too large, deflection occurs in reflection through the short side surfaces. As a result, the direction of output light is biased largely, so that anisotropy of emitted light intensity in the light-transmitting direction of the light pipe becomes large. As a result, light utilizing efficiency is also lowered, and this is apt to cause lowering of display quality.

It is desirable from this point of view that the direction of arrangement of the prism-like irregularities with respect to the reference plane of the incident side surface, that is, the inclination angle in the ridgeline direction of the prism-like irregularities is within ±35 degrees, preferably within ±30 degrees, more preferably within ±25 degrees. Incidentally, the sign "±" means the direction of inclination with reference to the incident side surface. When resolution of the liquid-crystal cells is so low that moire does not occur or is negligible, a better result is obtained as the direction of arrangement of the prism-like irregularities is more parallel with the incident side surface.

Any suitable form can be applied to the light pipe as described above. Also when the light pipe is formed like a wedge, or the like, the shape of the light pipe can be determined suitably and any suitable surface shape such as a straight-line surface, a curved surface, or the like, may be applied to the light pipe. Also the slope constituting the light output means and each of the prism-like irregularities may be formed in any surface configuration such as a straight-line surface, a refractive surface, a curved surface, or the like.

Further, the prism-like irregularities may be constituted by a combination of irregularities different in shape, or the like, in addition to the pitch. Further, the prism-like irregularities may be formed as a series of projections or recesses having continuous ridge lines or may be formed as intermittent projections or recesses which are arranged discontinuously in a ridge direction at intervals of a predetermined pitch.

The respective shapes of the lower and incident side surfaces of the light pipe need not be particularly limited but may be determined suitably. Generally, these surfaces are provided as a flat lower surface and an incident side surface perpendicular to the lower surface. The incident side surface may be formed, for example, into a concavely curved shape, or the like, corresponding to the outer circumference, or the like, of the light source so that improvement of light-incidence efficiency is attained. In addition, an incident side surface structure having an introductory portion interposed between the incident side surface and the light source may be provided. The shape of the introductory portion may be determined suitably in accordance with the shape of the light source, or the like.

The light pipe may be made of any suitable material which exhibits transparency in accordance with the wavelength range of the light source. Examples of the material used in a visible light range include transparent resin, for example, represented by acrylic resin, polycarbonate resin, epoxy resin, or the like; glass; and so on. A light pipe made of a material exhibiting no double refraction or slight double refraction is preferably used.

The light pipe may be formed by a cutting method or by any suitable method. Examples of the preferred producing method from the point of view of mass production, or the like, are: a method of transferring a shape to thermoplastic resin in a condition that the thermoplastic resin is hot-pressed against a mold capable of forming a predetermined shape; a method of filling a mold capable of forming a predetermined shape with hot-melted thermoplastic resin or with resin fluidized by heat or by a solvent; a method of performing a polymerizing process after filling a mold capable of forming a predetermined shape with liquid resin polymerizable by heat, by ultraviolet rays, by radiation, etc., or after casting the liquid resin in the mold; and so on.

Incidentally, the light pipe may be formed as a laminate of parts made of one kind of material or different kinds of materials, such as for example a laminate of a light-guide portion having a role of light transmission and a sheet having light output means (upper surface) such as prism-like irregularities, or the like, formed thereon. The sheet is bonded to the light-guide portion. That is, the light pipe need not be formed as an integral single-layer body constituted by one kind of material.

The thickness of the light pipe can be determined suitably on the basis of the size of the light pipe, the size of the light source, etc. in accordance with the purpose of use. The general thickness of the light pipe in use for forming a liquid-crystal display device, or the like, is not larger than 5 mm, especially in a range of from 0.1 to 3 mm, particularly in a range of from 0.3 to 2 mm, on the basis of the incident side surface thereof.

Before the attachment of the reflection layer, the preferred light pipe from the point of view of achievement of brilliant display, or the like, is provided so that the total light-rays transmissivity of incident light in directions of the upper and lower surfaces, particularly vertical incident light from the lower surface to the upper surface, is not lower than 90%, especially not lower than 92%, particularly not lower than 95% and that the haze is not higher than 30%, especially not higher than 15%, particularly not higher than 10%.

According to the aforementioned light pipe, incident light from the upper and lower surfaces passes through the lower or upper surface effectively. Hence, use of the light pipe makes it possible to form various devices such as a liquid-crystal display device, which can be used both in a reflection and a transmission mode and which is brilliant, easy to see and excellent in low electric power consumption because light accurately collimated by the light pipe is delivered in a direction excellent in perpendicularity advantageous to visual recognition so that the light emitted from the light source can be utilized efficiently.

In the liquid-crystal display device used both in the reflection and transmission modes, the arrangement of the reflection layer is essential for achievement of display in the reflection mode. According to the present invention, the reflection layer is arranged on the lower surface 12 of the light pipe as shown in FIG. 1. Although the reflection layer 3 may be disposed so as to be separated from the lower surface of the light pipe, it is preferable, from the point view of prevention of distortion inducing disorder of a reflected image, efficiency in assembling the liquid-crystal display device on the basis of integral handling, etc., to make the reflection layer 3 contact with the lower surface so as to be integrated with the lower surface as shown in FIG. 1.

The reflection layer can be made of a suitable material according to the background art. Especially, examples of the preferred materials are: a coating layer of binder resin impregnated with powder of a high-reflectivity metal such as aluminum, silver, gold, chromium, copper, tin, zinc, indium, palladium, platinum, or the like, or an alloy thereof; a layer of the aforementioned metal or a dielectric multilayer film deposited by a suitable thin-film forming method such as a vacuum evaporation method, a sputtering method, or the like; a reflection sheet of the aforementioned coating or deposited layer supported by a base material of a glass or resin film, or the like; and a reflection layer made of metal foil or rolled metal sheet, or the like.

The reflection layer preferred from the point of view of prevention of occurrence of moire, improvement in uniformity of display, or the like, on the basis of relaxation of bright-line intensity is provided so that diffuse reflection occurs. Because great reduction of the aforementioned light directivity is disadvantageous, the intensity of diffusion is preferably set to be in a range of from about 5 to 15 degrees in terms of the average diffusion angle but is not limited thereto. The diffusion type reflection layer can be formed by a suitable method such as a reflection surface roughening method, or the like, according to the background art.

A process for bringing the aforementioned reflection layer into contact with the lower surface of the light pipe to integrate the reflection layer with the light pipe can be performed by a suitable method such as a method using adhesive means such as a tacky layer, another adhesive layer, or the like, as a mediator, a method of forming the aforementioned coating or deposited layer directly on the lower surface of the light pipe, or the like. In this case, it is preferable from the point of view of preventing injury, oxidative degradation, etc. of the reflection surface that the outer surface of the reflection layer is protected by coating. In this respect, the aforementioned reflection sheet, or the like, may be used preferably. According to the reflection sheet, the aforementioned diffusion type reflection layer can be formed easily through the roughened surface of the film base material, or the like.

Incidentally, the treatment for roughening the surface of the aforementioned reflection layer or the support base material thereof can be performed by a suitable method such as a mechanical or chemical processing method of the type using embossing, buffing or transferring a rough-surface shape of a metal mold, a method of impregnating the reflection layer with suitable particles such as inorganic particles of silica, alumina, titania, zirconia, tin oxide, indium oxide, cadmium oxide, antimony oxide, etc. which may be electrically conductive, organic particles of crosslinked or non-crosslinked polymers, etc., or the like, a method of applying the impregnated layer, or the like.

When the liquid-crystal display device is to be formed, the light source 2 is disposed near to the incident side surface 13 of the light pipe 1 as shown in FIG. 1, so that the light source 2 serves as the back light of a side light type. Any suitable material can be used as the light source. Examples of the material which can be used preferably are: a linear light source such as a (cold or hot) cathode tube, or the like; a point light source such as a light-emitting diode, or the like; an array of point light sources arranged in a line, a plane, or the like; a light source using a system for converting a point light source into a regular-interval or irregular-interval linear light-emitting state; and so on.

According to the present invention, the light source is provided to make visual recognition possible in a transmission mode. Accordingly, the light source is provided so as to be able to be switched on/off because it is not necessary to switch the light source on for visual recognition in a reflection mode. Any method can be employed as a method for switching the light source on/off. Any one of background-art methods may be employed. Incidentally, the light source may be attached to the light pipe in advance so that the light pipe can be disposed in the form of a light pipe having a light source.

For the formation of the liquid-crystal display device, the light source may be provided as a combination body in which suitable auxiliary means such as a light source holder for surrounding the light source to lead scattered light from the light source 2 to the incident side surface 13 of the light pipe 1 is disposed as occasion demands. A resin sheet with a high-reflectivity metal thin film attached thereto, metal foil, or the like, is generally used as the light source holder.

When the light source holder is bonded to an end portion of the light pipe through an adhesive, or the like, the formation of the light output means in the adhesive portion may be omitted.

Incidentally, as shown in FIG. 1, the liquid-crystal display device is generally formed by suitably assembling the liquid-crystal cells 52 provided with a transparent electrode (not shown) so as to serve as a liquid-crystal shutter; a driving device attached to the liquid-crystal cells 52; the polarizing plates 51 and 53, the back light 1 and 2, the reflection layer 3 and constituent parts such as a compensating phase difference plate, etc. as occasion demands. In this case, according to the present invention, the light diffusion layer 4 having polarization-keeping characteristic is disposed between the light pipe 1 and the liquid-crystal shutter 5 as shown in FIG. 1.

The arrangement of the light diffusion layer aims at diffusing light delivered from the light pipe and external light both in a transmission mode and a reflection mode to make light emission uniform for improvement of a visual recognition property, etc. Particularly, according to the present invention, the aforementioned slope portions constituted by the short side surfaces and the like of the light output means of the light pipe, which have a role of reflecting light incident on the side surfaces of the light output means toward the lower surface side, do not deliver light which is reflected on the lower surface, from the upper surface. Moreover, leakage light may be generated in a transmission mode, so that bright lines and dark lines may be generated at an angle of visual recognition. In this case, the pattern of the light output means becomes visible conspicuously to hurt the display quality. Therefore, the arrangement of the light diffusion layer is effective for relaxing the bright lines and the dark lines to level the difference between light and darkness to thereby prevent the pattern from becoming visible. Moreover, the leveling of the difference between light and darkness is also effective for prevention of occurrence of moire and suppression of the visual sense of dazzling light caused by metallic reflection.

In the above description, according to the present invention, a layer having polarization-keeping characteristic for diffusing polarized light while keeping the polarized state of the light as sufficiently as possible is used as the light diffusion layer. This aims at preventing both brilliance and display quality from being lowered. That is, when the polarizing plate 53 is disposed on the visual-recognition back surface of the liquid-crystal cells 52 as shown in FIG. 1, linearly polarized light is incident onto the light diffusion layer 4 through the polarizing plate 53 in a reflection mode while light reflected through the reflection layer 3 is transmitted through the polarizing plate 53. If the linearly polarized light is eliminated in this occasion, absorption loss due to the polarizing plate 53 occurs so that both brilliance and display quality are lowered.

A reflection polarizer, or the like, which selectively reflects light polarized in the aforementioned predetermined state so that the sum of reflectivity and transmissivity can exceed 100%, may be incorporated so that display is achieved by use of light linearly or circularly polarized through the reflection polarizer. In this case, there is a problem that, when, for example, the reflection polarizer is provided as a system using circularly polarized light, black cannot be displayed if the polarized state of the light changes through the light diffusion layer.

A suitable layer capable of keeping the polarized state of light, such as a light-transmissible resin layer containing dispersed beads, dispersed transparent particles, dispersed bubbles by rapid evaporation of a solvent, or the like; a light-transmissible resin layer having crazes or surface fine roughness structure given by a mechanical treatment or by a process using a solvent; or the like; can be used as the polarization-keeping light diffusion layer. Especially, a layer, which is excellent in light transmissivity and which has such diffusing power that the polarization characteristic of light is not eliminated as possible, is preferably used.

Incidentally, it is preferable in terms of the degree of the polarization-keeping characteristic that the transmissivity of leakage light caused by elimination of polarization is not higher than 2%, especially not higher than 1.8%, particularly not higher than 1.5%, for example, in the condition that prism polarizers, or the like, disposed in crossed-Nicol are used so that completely polarized light is incident onto the light diffusion layer disposed between the prism polarizers. On the other hand, the preferred light transmissivity of the light diffusion layer is not lower than 80%, especially not lower than 85%, particularly not lower than 90%, in terms of total light-rays transmissivity by use of an integrating sphere.

The aforementioned polarization-keeping light diffusion layer can be achieved, for example, by reducing birefringence as possible, especially reducing the phase difference to be not larger than 30 nm, reducing the average number of scattering times in a locus of light rays, etc. because elimination of polarization is generally caused by birefringence and multiple scattering. In this respect, the polarization-keeping light diffusion layer can be obtained advantageously as a light-transmissible resin layer containing dispersed transparent particles, a light-transmissible resin layer having a fine roughness structure as its surface, or the like, as described above.

A suitable light-transmissible material can be used as the aforementioned light-transmissible resin. Especially, an optically isotropic material of little birefringence such as triacetyl cellulose resin, polymethyl methacrylate, polycarbonate or norbornene resin can be preferably used from the point of view of reduction of birefringence.

On the other hand, examples of the dispersed transparent particles contained in the light-transmissible resin layer include inorganic fine particles of silica, glass, alumina, titania, zirconia, tin oxide, indium oxide, cadmium oxide, antimony oxide, etc. which may be electrically conductive; organic fine particles of crosslinked or non-crosslinked polymers such as acrylic polymer, polyacrylonitrile, polyester, epoxy resin, melamine resin, urethane resin, polycarbonate, polystyrene, silicone resin, benzoguanamine, melamine-benzoguanamine condensate and benzoguanamine-formaldehyde condensate; and so on.

One kind or two or more kinds of transparent particles may be used. In the transparent particles, a particle size in a range of from 1 to 20 μm is preferred from the point of view of diffusion of light, uniformity of the diffusion, etc. On the other hand, the particle shape of the transparent particles can be selected at option. Generally, a (true) sphere, a secondary aggregate of spheres, or the like, is used as the particle shape. Particularly, transparent particles, in which the refractive index ratio of the transparent particles to the optically isotropic light-transmissible resin is in a range of from 0.9 to 1.1, can be preferably used from the point of view of the polarization-keeping characteristic.

The light diffusion layer containing such particles can be formed by a suitable method according to the background art, such as a method of extrusion-molding a sheet, or the like, from a mixture of a resin solution and transparent particles; a method of casting a sheet, or the like, from a mixture of a resin solution or monomer and transparent particles and performing a polymerizing process if necessary; or a method of applying a resin solution containing transparent particles onto a predetermined surface, a polarization-keeping support film, or the like. Hence, the light-transmissible resin layer may be constituted by a tacky layer, or the like.

On the other hand, the light diffusion layer having a fine roughness structure as its surface can be formed by a suitable method such as a method of roughening a surface of a sheet of a light-transmissible resin through a buffing process using sandblasting, or the like, or through an embossing process, or the like; or a method of forming a layer of a light-transmissible material having protrusions on a surface of the sheet.

The aforementioned fine roughness structure on the surface of the light diffusion layer is preferably constituted by-acyclic irregularities with a surface roughness not smaller than the wavelength of incident light and not larger than 100 μm from the point of view of diffusion of light, uniformity of the diffusion, etc. Incidentally, for the formation of the aforementioned light diffusion layer of the type containing transparent particles or the type having a surface fine roughness structure, suppressing increase of the phase difference in the base layer of the light-transmissible resin because of photoelasticity and orientation as sufficiently as possible is particularly preferred from the point of view of polarization-keeping characteristic, etc.

One light diffusion layer or two or more light diffusion layers may be disposed between the light pipe and the liquid-crystal shutter, particularly, the liquid-crystal cells thereof. When two or more light diffusion layers are disposed, the light diffusion layers may be the same or may be different but the light diffusion layers need to have polarization-keeping characteristic as a whole. The light diffusion layer may be in close contact with adjacent parts so as to be integrated with the adjacent parts or may be merely piled on adjacent parts so as to be separated from the adjacent parts easily. Incidentally, when the liquid-crystal shutter 5 has the polarizing plate 53 on its visual-recognition back surface as shown in FIG. 1, one polarization-keeping light diffusion layer 4 may be disposed on either liquid-crystal cell 52 side or light pipe 1 side of the polarizing plate 53 or two polarization-keeping light diffusion layers 4 may be disposed on both sides of the polarizing plate 53.

The liquid-crystal cells used for forming the liquid-crystal shutter are not particularly limited. For example, in classification based on the orientation form of liquid crystal, suitable cells can be used as to whether TN liquid-crystal cells or STN liquid-crystal cells, whether perpendicularly oriented cells or HAN cells, whether twist type liquid-crystal cells such as OCB cells or non-twist type liquid-crystal cells, whether guest-host type liquid-crystal cells or ferroelectric liquid-crystal type liquid-crystal cells, etc. Further, the liquid-crystal driving method is not particularly limited. For example, a suitable driving method such as an active matrix method, a passive matrix method, or the like, may be used.

Further, a suitable plate can be used as the polarizing plate. From the point of view of obtaining display of a good contrast ratio on the basis of incidence of high-grade linearly polarized light, etc., a plate of high degree of polarization such as an iodine type or dye type absorption linear polarizer may be preferably used. Incidentally, two polarizing plates may be provided on both sides of the liquid-crystal cells 52 as shown in FIG. 1 or only one polarizing plate may be provided on either side of the liquid-crystal cells, especially on the visual recognition side of the same.

For the formation of the liquid-crystal display device, for example, a suitable optical element such as a light diffusion layer, an anti-glare layer or a protective layer to be provided on the visual recognition side or a suitable optical element such as a compensating phase difference plate to be provided between the liquid-crystal cells and the polarizing plate may be disposed suitably. Accordingly, the aforementioned polarization-keeping light diffusion layer can be disposed so as to be in close contact with such an optical element to be provided adjacently. In this case, the polarization-keeping light diffusion layer may be provided as an attachment layer such as a coating layer to be applied onto the optical element.

In order to compensate birefringence depending on wavelength to thereby improve the visual recognition property, etc., the aforementioned compensating phase difference plate is disposed between the polarizing plate on the visual recognition side and the liquid-crystal cells and/or between the polarizing plate on the back surface and the liquid-crystal cell, or the like, as occasion demands. According to the present invention, however, it is preferable from the point of view of keeping the light output characteristic of the light pipe as sufficiently as possible that the number of optical layers disposed between the liquid-crystal cells and the light pipe is as small as possible. Incidentally, a suitable plate can be used as the compensating phase difference plate in accordance with the wave range, or the like. The compensating phase difference plate may be formed as a single layer or as a layer of superposition of two or more phase difference layers.

Visual recognition on the liquid-crystal display device according to the present invention is performed through light transmitted through the long side surfaces of the light pipe as described above. Incidentally, in a transmission mode, light α emitted from the lower surface of the light pipe 1 in the switched-on state of the light source as shown by the arrow in FIG. 3 is reflected through the reflection layer 3 and transmitted through the long side surfaces 11b of the light pipe 1, so that a display image (α) is visually recognized via the light diffusion layer 4, the polarizing plates 53 and 51, and the liquid-crystal cells 52.

On the other hand, in a reflection mode, external light γ as shown by the arrow in FIG. 4 in the switched-off state of the light source is transmitted through the long side surfaces 11b of the upper surface of the light pipe 1 via the polarizing plates 51 and 53, the liquid-crystal cells 52, and the light diffusion layer 4. Then, the transmitted light is reflected through the reflection layer 3 and transmitted through the long side surfaces 11b of the light pipe 1 in the same manner as described above in the transmission mode, so that a display image (γ) is visually recognized via the light diffusion layer 4, the polarizing plates 53 and 51, and the liquid-crystal cells 52.

According to the present invention, optical elements or parts such as the light pipe, the light diffusion layer, the liquid-crystal cells, the polarizing plates, etc. constituting the aforementioned liquid-crystal display device may be wholly or partially laminated and fixed so as to be integrated with one another or may be disposed in an easily separable state. From the point of view of prevention of lowering of contrast due to suppression of interfacial reflection, or the like, it is preferable that the optical elements or parts are fixed. A suitable transparent adhesive such as an adhesive can be used for the fixing and contacting process. In addition, the transparent adhesive layer may be impregnated with the aforementioned fine particles, or the like, so that the transparent adhesive layer can be provided as an adhesive layer exhibiting a diffusing function.

EXAMPLE 1

A surface of a polymethyl methacrylate plate processed into a predetermined shape in advance was cut by a diamond bit so that a light pipe having light output means at its upper surface was obtained. The light pipe was 40 mm wide and 25 mm deep. The light pipe was 1 mm thick at its incident side surface and 0.6 mm thick at its opposite end. Upper and lower surfaces of the light pipe were flat. The light pipe had prism-like irregularities at its upper surface. The prism-like irregularities were arranged at intervals of a pitch of 210 μm so as to be parallel with the incident side surface. Each of the prism-like irregularities had a short side surface inclined at an inclination angle changing in a range of from 42.5 to 43 degrees, and a long side surface inclined at an inclination angle changing in a range of from 1.8 to 3.5 degrees. The change of the inclination angle between adjacent long side surfaces was within 0.1 degrees. The protected width of the short side surface on the lower surface was from 10 to 16 μm. The projected area ratio of long side surface/short side surface on the lower surface was not lower than 12. Incidentally, the light output means was formed so as to extend from a position at a distance of 2 mm from the incident side surface.

A cold-cathode tube (made by HARISON ELECTRIC Co., Ltd.) with a diameter of 2.4 mm was disposed near to the incident side surface of the light pipe. An edge of the cold-cathode tube was surrounded by a light source holder made of a white lamp reflection sheet so as to come into close contact with the upper and lower end surfaces of the light pipe. An inverter and a DC power supply were connected to the cold-cathode tube. A diffusion type reflection sheet was bonded through its silver vapor deposited surface onto the lower surface of the light pipe by a tacky layer. A monochrome TN type liquid-crystal shutter was disposed on the upper surface of the light pipe through a light diffusion sheet. Thus, a liquid-crystal display device was obtained.

Incidentally, the aforementioned light source was able to be switched on/off by turning the DC power supply on/off. Further, the aforementioned diffusion type reflection sheet was of a diffusion type in which a vapor deposit layer of silver was formed on a matted film base material and in which a surface of the vapor deposit layer was coated with a transparent resin layer so as to be protected.

Further, the light diffusion sheet was formed by coating one surface of an 80 μm-thick triacetyl cellulose film with a 25 μm-thick layer containing 100 parts (parts by weight, which will apply hereunder) of an adhesive (solid content), and 30 parts of TOSPEARL 145 (made by Toshiba Silicone Co., Ltd.) dispersed in the adhesive. The phase difference of the light diffusion sheet was 6 nm. The quantity of leakage light caused by elimination of polarization in the condition that the light diffusion sheet was disposed between Glan-Thompson prisms in crossed-Nicol (this condition will apply hereunder) was 1.1% of the total incident light. The total light-rays transmissivity and haze measured by a haze meter (made by Murakami Color Research Laboratory according to JIS 7105, which will apply hereunder) were 94% and 84% respectively. Incidentally, the phase difference was examined on the triacetyl cellulose film by a phase difference evaluator (made by Oji Scientific Instruments Co. Ltd.).

EXAMPLE 2

A liquid-crystal display device was obtained according to Example 1 except that the light diffusion sheet was bonded to the cell base plate and that a polarizing plate was adhesively disposed on the outside of the light diffusion sheet.

EXAMPLE 3

A liquid-crystal display device was obtained according to Example 1 except that the light diffusion sheet was not disposed.

EXAMPLE 4

A liquid-crystal display device was obtained according to Example 1 except that the light diffusion sheet was adhesively disposed between the light pipe and the diffusion type reflection sheet.

EXAMPLE 5

A liquid-crystal display device was obtained according to Example 1 except that a sheet using a 50 μm-thick polyester film with a phase difference of 1780 nm as a substitute for the triacetyl cellulose film was used as the light diffusion sheet so that the quantity of leakage light caused by elimination of polarization was 5.3% of the total incident light, and the total light-rays transmissivity and haze were 93% and 83% respectively. Incidentally, the phase difference was examined by a spectral double refraction measuring system (made by ORC Manufacturing Co. Ltd.).

EXAMPLE 6

A liquid-crystal display device was obtained according to Example 2 except that the light diffusion sheet was replaced by one used in Example 5.
Evaluation Test With respect to the liquid-crystal display device obtained in each of Examples 1 to 5, frontal brightness in a white display state in each of transmission and reflection modes was examined by a brightness meter (BM7, made by TOPCON Corp.). Incidentally, frontal brightness in a transmission mode was evaluated in the condition that the light source was switched on in a dark room. On the other hand, frontal brightness in a reflection mode was evaluated in the condition that the light source was switched off in the dark room but the device was illuminated by a ring-like illuminator disposed in a position at a distance of 10 cm upward from the center portion of the device.

Results of the foregoing evaluation test were as shown in the following Table.

|  | Example | 1 | 2 | 3 | 4 | 5 | 6 |
|---|---|---|---|---|---|---|---|
| Frontal Brightness (cd/m²) | Transmission Mode | 314 | 311 | 342 | 309 | 175 | 162 |
|  | Reflection Mode | 827 | 819 | 875 | 807 | 504 | 469 |

From the display quality in the transmission and reflection modes in the aforementioned condition and the aforementioned Table, Examples 1 and 2 were particularly excellent because uniform brilliance was obtained in the device as a whole both in the transmission and the reflection mode so that the visual sense of the pattern of the light output means was weak as well as the visual sense of dazzling light was avoided. In Examples 1 and 2, the display was very clear, delicate and brilliant.

On the contrary, in Examples 3 and 4, the pattern of the light output means became visible conspicuously. Particularly, in the reflection mode in Example 4, the display was intensive in the visual sense of dazzling light caused by metallic reflection. In Examples 5 and 6, the display was dark both in the transmission and the reflection mode. Particularly, in Example 6, unnatural coloring occurred in accordance with the view angle to thereby give a visual sense of dazzling light different from that caused by metallic reflection, so that the display quality was lowered greatly.

It is apparent from the above description that the light source can be switched on/off by turning the power supply on/off to thereby achieve a liquid-crystal display device exhibiting good display characteristic both in a transmission and a reflection mode and that use of the reflection mode together with the transmission mode permits electric power consumption to be saved so that the working life of a battery used in a portable display device, or the like, can be made longer.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A liquid-crystal display device comprising:
    a light pipe including light output means formed on an upper surface of said light pipe;
    a light source disposed near to an incident side surface of said light pipe so that light incident on said light pipe from said light source is output from an upper surface of said light pipe through said light output means;
    a reflection layer disposed on the lower surface of said light pipe so that light reflected from said light output means is made incident on and reflected by said reflection layer to travel toward said upper surface of said light pipe;
    a light diffusion layer having polarization-keeping characteristic; and
    a liquid-crystal shutter disposed on the upper surface of said light pipe through said light diffusion layer, said liquid-crystal shutter including liquid-crystal cells and at least one polarizing plate.

2. A liquid-crystal display device according to claim 1, wherein said light source can be switched on and off.

3. A liquid-crystal display device according to claim 1, wherein said light output means provided on the upper surface of said light pipe comprising:
    slopes facing said incident side surface and inclined at an angle of from 35 to 45 degrees with respect to a reference plane of said lower surface; and
    flat surfaces inclined at a crossing angle of not larger than 10 degrees with respect to said reference plane and provided so that projected area of said flat surfaces on said reference plane is not smaller than 8 times as large as projected area of said slopes on said reference plane.

4. A liquid-crystal display device according to claim 1, wherein said light output means on said upper surface of said light pipe has a repetition structure of continuous or discontinuous prism-like irregularities arranged at intervals of a pitch of from 50 μm to 1.5 mm, each of said prism-like irregularities comprising:
    a short side surface constituted by slopes inclined downward from the incident side surface to an opposite end at an inclination angle of from 35 to 45 degrees with respect to said reference plane of said lower surface; and a long side surface constituted by a slope inclined at an inclination angle in a range of from 0 to 10 degrees, exclusive of 0 degree, with respect to said reference plane so that the difference in the inclination angle among all of said slopes of the long side surface is within 5 degrees and the difference in the inclination angle between adjacent long side surfaces is within 1 degree, wherein projected area of the long side surfaces on said reference plane is not smaller than 8 times as large as projected area of the short side surfaces on said reference plane.

5. A liquid-crystal display device according to claim 4, wherein the repetition pitch of said prism-like irregularities is constant.

6. A liquid-crystal display device according to claim 4, wherein a projected width of each of said short side surfaces on said reference plane is not larger than 40 μm.

7. A liquid-crystal display device according to claim 4, wherein a ridge line direction of said prism-like irregularities is within ±35 degrees with respect to a reference plane of said incident side surface.

8. A liquid-crystal display device according to claim 1, wherein incident light from said lower surface is transmitted through said upper surface at total light-rays transmissivity of not lower than 90%.

9. A liquid-crystal display device according to claim 1, wherein said reflection layer is made of at least one selected from the group of consisting gold, silver, aluminum and a dielectric multilayer film.

10. A liquid-crystal display device according to claim 1, wherein said reflection layer is in close contact with said lower surface of said light pipe so as to be integrated therewith.

11. A liquid-crystal display device according to claim 1, wherein said reflection layer reflects light while diffusing said light.

12. A liquid-crystal display device according to claim 1, wherein said polarization-keeping light diffusion layer exhibits light transmissivity of not higher than 2% when said light diffusion layer is disposed between crossed-Nicol prisms.

13. A liquid-crystal display device according to claim 4, wherein said light source can be switched on and off.

14. A liquid-crystal display device according to claim 4, wherein incident light from said lower surface is transmitted through said upper surface at total light-rays transmissivity of not lower than 90%.

15. A liquid-crystal display device according to claim 4, wherein said reflection layer is made of at least one selected from the group of consisting gold, silver, aluminum and a dielectric multilayer film.

16. A liquid-crystal display device according to claim 4, wherein said reflection layer is in close contact with said lower surface of said light pipe so as to be integrated therewith.

17. A liquid-crystal display device according to claim 4, wherein said reflection layer reflects light while diffusing said light.

18. A liquid-crystal display device according to claim 4, wherein said polarization-keeping light diffusion layer exhibits light transmissivity of not higher than 2% when said light diffusion layer is disposed between crossed-Nicol prisms.

* * * * *